(12) United States Patent
Rossner et al.

(10) Patent No.: US 11,865,568 B2
(45) Date of Patent: Jan. 9, 2024

(54) SPRAY TIP DESIGN AND MANUFACTURE

(71) Applicant: Wagner Spray Tech Corporation, Plymouth, MN (US)

(72) Inventors: Ross D. Rossner, Leander, TX (US); Eric R. Seckerson, Greenfield, MN (US)

(73) Assignee: Wagner Spray Tech Corporation, Plymouth, MN (US)

( * ) Notice: Subject to any disclaimer, the term of this patent is extended or adjusted under 35 U.S.C. 154(b) by 121 days.

(21) Appl. No.: 17/349,397

(22) Filed: Jun. 16, 2021

(65) Prior Publication Data
US 2021/0308704 A1 Oct. 7, 2021

Related U.S. Application Data

(62) Division of application No. 16/297,885, filed on Mar. 11, 2019.
(Continued)

(51) Int. Cl.
*B21K 21/08* (2006.01)
*B23P 13/02* (2006.01)
(Continued)

(52) U.S. Cl.
CPC ............... *B05B 9/01* (2013.01); *B05B 1/04* (2013.01); *B05B 1/34* (2013.01); *B21K 21/08* (2013.01); *B23K 26/389* (2015.10); *B23P 13/02* (2013.01); *Y10T 29/49323* (2015.01); *Y10T 29/49432* (2015.01)

(58) Field of Classification Search
CPC .... B05B 9/01; B05B 1/04; B05B 1/34; B05B 1/048; B05B 15/534; B05B 15/65; B21K 21/08; B23K 26/389; B23P 13/02; Y10T 29/49323; Y10T 29/49432
See application file for complete search history.

(56) References Cited

U.S. PATENT DOCUMENTS 3,000,576 A 9/1961 Levey et al.
3,202,360 A 8/1965 O'brien
(Continued)

FOREIGN PATENT DOCUMENTS

CA 1038622 A 9/1978
CN 1498137 A 5/2004
(Continued)

OTHER PUBLICATIONS

Nordson, Airless Nozzle Catalog, Dec. 2003, Pub. Part. No 107963, Nordson Corporation Liquid Finishing Systems, Amherst, OH, pp. 1-202 (Year: 2003).*
(Continued)

*Primary Examiner* — Moshe Wilensky
*Assistant Examiner* — Darrell C Ford
(74) *Attorney, Agent, or Firm* — Christopher J. Volkmann; Kelly, Holt & Christenson, PLLC

(57) ABSTRACT

A spray tip for a fluid applicator includes a stem configured to be inserted into the fluid applicator. The stem includes a stem pre-orifice portion and an insert receiving portion. The spray tip includes a pre-orifice insert having an inlet and an outlet. The pre-orifice insert is disposed within the insert receiving portion and disposed against a rearward shoulder of the stem.

20 Claims, 17 Drawing Sheets

Related U.S. Application Data

(60) Provisional application No. 62/643,265, filed on Mar. 15, 2018.

(51) Int. Cl.

| | | |
|---|---|---|
| *B05B 9/01* | (2006.01) | |
| *B05B 1/04* | (2006.01) | |
| *B05B 1/34* | (2006.01) | |
| *B23K 26/382* | (2014.01) | |

(56) References Cited

U.S. PATENT DOCUMENTS

| | | |
|---|---|---|
| 3,556,411 A | 1/1971 | Nord et al. |
| 3,633,828 A | 1/1972 | Larson |
| 3,858,812 A | 1/1975 | Williams et al. |
| 3,865,314 A | 2/1975 | Levey et al. |
| 3,955,763 A | 5/1976 | Pyle et al. |
| 4,074,857 A | 2/1978 | Calder |
| 4,157,163 A | 6/1979 | Pinto et al. |
| 4,165,836 A | 8/1979 | Eull |
| 4,337,281 A | 6/1982 | Boone |
| 4,346,849 A | 8/1982 | Rood |
| 4,349,947 A | 9/1982 | Rood |
| 4,437,610 A | 3/1984 | Huber et al. |
| 4,484,707 A | 11/1984 | Calder |
| 4,508,268 A | 4/1985 | Geberth, Jr. |
| 4,611,758 A | 9/1986 | Geberth, Jr. |
| 4,635,850 A | 1/1987 | Leisi |
| 4,637,551 A | 1/1987 | Seeger, Jr. et al. |
| 4,721,250 A | 1/1988 | Kennedy et al. |
| 4,760,956 A | 8/1988 | Mansfield |
| 4,815,665 A | 3/1989 | Haruch |
| 4,828,182 A | 5/1989 | Haruch |
| 5,294,053 A | 3/1994 | Perret |
| 5,505,381 A | 4/1996 | Tomtore |
| 5,749,528 A | 5/1998 | Carey et al. |
| 5,765,753 A | 6/1998 | Kieffer |
| 5,829,679 A | 11/1998 | Strong |
| 5,875,922 A | 3/1999 | Chastine et al. |
| 5,887,793 A | 3/1999 | Kieffer |
| 5,893,522 A | 4/1999 | Kieffer |
| 5,911,364 A | 6/1999 | Johnson et al. |
| 6,261,367 B1 | 7/2001 | Donges |
| 6,264,115 B1 | 7/2001 | Liska et al. |
| 6,352,184 B1 | 3/2002 | Stern et al. |
| 6,390,386 B2 | 5/2002 | Krohn et al. |
| 6,434,822 B1* | 8/2002 | Perry .................. F02M 61/168 |
| | | 239/584 |
| 6,465,047 B1 | 10/2002 | Scott et al. |
| 6,481,640 B1 | 11/2002 | Carey et al. |
| 6,481,645 B1* | 11/2002 | Taylor-McCune ........ B05B 1/28 |
| | | 239/487 |
| 6,502,763 B1 | 1/2003 | McCann |
| 6,655,606 B2 | 12/2003 | Earl |
| 6,702,198 B2 | 3/2004 | Tam et al. |
| 7,328,853 B2 | 2/2008 | Carey et al. |
| D651,691 S | 1/2012 | Muetzel et al. |
| 8,545,937 B2 | 10/2013 | Kosovish et al. |
| 8,596,555 B2 | 12/2013 | Thompson et al. |
| 8,814,070 B2 | 8/2014 | Drozd et al. |
| 9,010,658 B2 | 4/2015 | Johnson et al. |
| 9,016,599 B2 | 4/2015 | Johnson et al. |
| 9,085,008 B2 | 7/2015 | Kinne et al. |
| 9,192,952 B2 | 11/2015 | Becker et al. |
| 10,913,079 B2 | 2/2021 | Wenzel et al. |
| 2002/0014541 A1 | 2/2002 | Krohn et al. |
| 2003/0080213 A1 | 5/2003 | Clauss et al. |
| 2003/0189114 A1 | 10/2003 | Taylor et al. |
| 2004/0046069 A1 | 3/2004 | Gromes |
| 2004/0195354 A1 | 10/2004 | Leisi |
| 2007/0129469 A1 | 6/2007 | Befurt et al. |
| 2008/0017734 A1 | 1/2008 | Micheli et al. |
| 2011/0079667 A1* | 4/2011 | Stastny ................... F23R 3/28 |
| | | 29/890.142 |
| 2012/0043399 A1 | 2/2012 | Fortier et al. |
| 2012/0097765 A1 | 4/2012 | Drozd et al. |
| 2012/0205466 A1 | 8/2012 | Baltz et al. |
| 2012/0223155 A1 | 9/2012 | Murdock, Jr et al. |
| 2013/0001328 A1 | 1/2013 | Hsu |
| 2013/0037629 A1 | 2/2013 | Boquet |
| 2015/0060577 A1* | 3/2015 | Kosovich ............ B05B 13/0627 |
| | | 239/390 |
| 2016/0303585 A1 | 10/2016 | Wenzel et al. |
| 2016/0339462 A1* | 11/2016 | Becker .................. B05B 1/3006 |
| 2019/0283054 A1 | 9/2019 | Rossner et al. |

FOREIGN PATENT DOCUMENTS

| | | |
|---|---|---|
| CN | 1812843 A | 8/2006 |
| CN | 200939415 Y | 8/2007 |
| CN | 104148198 A | 11/2014 |
| CN | 204429517 U | 7/2015 |
| DE | 1218322 B | 6/1966 |
| DE | 2506811 | 8/1975 |
| DE | 2622396 B2 | 12/1976 |
| DE | 8032826 U1 | 7/1981 |
| DE | 3046464 A1 | 7/1982 |
| DE | 3513587 A1 | 11/1985 |
| DE | 4401488 A1 | 7/1995 |
| DE | 19513927 | 10/1995 |
| EP | 0054124 A1 | 6/1982 |
| EP | 0112181 B1 | 6/1984 |
| EP | 0804969 A2 | 5/1997 |
| EP | 1445030 A2 | 8/2004 |
| EP | 2136928 B1 | 12/2009 |
| EP | 2544824 B1 | 1/2013 |
| GB | 2288348 A | 10/1995 |
| JP | 05-337405 A | 12/1993 |
| JP | 2002-522206 A | 7/2002 |
| JP | 2013-244429 A | 12/2013 |
| WO | 2005005055 A1 | 1/2005 |
| WO | 2007092850 A2 | 8/2007 |
| WO | 2007092850 A3 | 8/2007 |
| WO | WO 2008008189 A1 | 1/2008 |
| WO | WO 2009147443 A2 | 12/2009 |
| WO | 2011094246 A1 | 8/2011 |
| WO | 2015039078 | 3/2015 |
| WO | 2016128033 A1 | 8/2016 |
| WO | 2016172105 | 10/2016 |

OTHER PUBLICATIONS

Prosecution History for U.S. Appl. No. 16/297,885 including: Notice of Appeal filed Sep. 28, 2021, Advisory Action dated Sep. 27, 2021, and Amendment dated Aug. 26, 2021, 12pages.
First Office Action for Chinese Patent Application No. 201980017392.3 dated Jun. 21, 2021, 23 pages with English Translation.
Final Office Action for U.S. Patent Application No. 16/297,885 dated Jun. 28, 2021, 14 pages.
Extended Search Report for European Patent Application No. 19767505.1, dated Sep. 16, 2021, 8 pages.
Rejection Decision for Chinese Patent Application No. 201980017392.3 dated Apr. 12, 2022, 14 pp. with English Translation.
Delavan Spray Technologies, Airless Tips, retrieved at http://www.delavan.co.uk/pdfs/Airless%20Tips.pdf on Nov. 8, 2016, pp. 1-2.
Goodrich, Delavan Spray Technologies, Airless Products, retrieved at http://pdf.directindustry.com/pdf/delavan-spray-technologies/airless-products/13166-102842.html on Nov. 8, 2016, pp. 1-4.
Ecco Finishing . Spare parts list for Airless spray tips, retrieved at http://www.eccofinishing.se/API/DownloadFile.ashx?fileID=3537cd88-d0ed-4a58-a209-af71fb29fc79&type=sparepart&lang=en, issued Feb. 2007, pp. 1-2.
Wagner, Wagner GM 4700AC Operating Manual, Jun. 2014, p. 65.
First Office Action for Chinese Patent Application No. 201680002734.0 dated Jul. 2, 2018, 15 pages.
International Search Report and the Written Opinion for PCT/US2016/028285, dated Jul. 18, 2016, Filed Apr. 19, 2016. 11 pages.
Wagner, Aircoat-Wendeschalter Manual, Mar. 1995, pp. 1-2. Germany with Machine Translation.

(56) References Cited

OTHER PUBLICATIONS

International Preliminary Report on Patentability for International Patent Application No. PCT/US2016/028285 dated Oct. 24, 2017, 8 pages.
European Search Report, dated Jan. 31, 2018, 11 pages.
Canadian Office Action, dated Feb. 9, 2018, 6 pages.
Second Examination Report for Australian Patent Application No. 2016252285 dated Feb. 4, 2019, 6 pages.
Office Action for Canadian Patent Application No. 2,955,118 dated Nov. 14, 2018, 4 pages.
Examination Report No. 1 for Australian Patent Application No. 2016252285, dated Oct. 13, 2018, 3 pages.
Second Office Action for Chinese Patent Application No. 201680002734.0 dated Mar. 4, 2019. 17 pages.
Prosecution History for U.S. Appl. No. 15/132,894 including: Amendment with RCE dated Apr. 17. 2019 Final Office Action dated Dec. 26, 2018, Amendment dated Aug. 9, 2018, Non-Final Office Action dated Apr. 23, 2018. Response to Restriction Requirement dated Dec. 12, 2017. Restriction Requirement dated Nov. 28. 2017, Preliminary Amendment dated Mar. 17, 2017, Preliminary Amendment dated Mar. 2, 2017, and Application and Drawings filed Apr. 19, 2016, 189 pages.
Third Examination Report for Australian Patent Application No. 2016252285 dated May 30, 2019, 2 pages.
International Search Report and Written Opinion for International Patent Application No. PCT/US2019/021782, dated Jun. 26, 2019, date of filing: Mar. 12, 2019, 12 pages.
Non-Final Office Action for U.S. Appl. No. 15/132,894 dated Jul. 23, 2019, 23 pages.
First Examination Report for India Patent Application No. 201627044575 dated Sep. 24, 2019, 8 pages.
Office Action for Canadian Patent Application No. 2,955,118 dated Sep. 25, 2019, 3 pages.
Third Office Action for Chinese Patent Application No. 201680002734.0 dated Sep. 11, 2019, 10 pages with English Translation.
Communication Pursuant to Article 94(3) for European Patent Application No. 16783689.9 dated Dec. 17, 2019, 4 pages.
Amendment for U.S. Appl. No. 15/132,894 dated Oct. 16, 2019, 20 pages.
Final Office Action for U.S. Appl. No. 15/132,894 dated Jan. 29, 2020, 23 pages.
Prosecution History for U.S. Appl. No. 15/132,894 including: Pre-Brief Appeal Conference Decision dated May 12, 2020, Pre-Brief Conference Request and Notice of Appeal dated Apr. 23. 2020. 9 pages.
International Preliminary Report on Patentability for International Patent Application No. PCT/US2019/021782, dated Sep. 24, 2020, date of filing: Mar. 12, 2019, 9 pages.
Notice of Allowance for U.S. Appl. No. 15/132,894, dated Oct. 23, 2020, 9 pages.
Prosecution History for U.S. Appl. No. 16/297,885 including: Amendment filed Jun. 14, 2021, Non-Final Office Action dated May 7, 2021, Amendment with RCE dated Feb. 15, 2021, Final Office Action dated Nov. 24, 2020, Amendment dated Nov. 2, 2020, Non-Final Office Action dated Jul. 31, 2020, Response to Restriction Requirement dated Jul. 13, 2020, Restriction Requirement dated Jun. 4, 2020, and Application and Drawings filed Mar. 11, 2019, 95 pages.
Corrected Notice of Allowance for U.S. Appl. No. 15/132,894, dated Dec. 15, 2020, 5 pages.
Second Office Action for Chinese Patent Application No. 201980017392.3 dated Dec. 3, 2021, 14 pages with English Translation.

* cited by examiner

SPRAY TIP DESIGN AND MANUFACTURE

CROSS-REFERENCE TO RELATED APPLICATIONS

The present application is a divisional of and claims priority of U.S. patent application Ser. No. 16/297,885, filed Mar. 11, 2019, which is based on and claims the benefit of U.S. Provisional Patent Application Ser. No. 62/643,265, filed Mar. 15, 2018, the contents of which are hereby incorporated by reference in their entirety.

BACKGROUND

Spray tips are typically used in a variety of applications to break up, or atomize, a liquid material for delivery in a desired spray pattern. Some exemplary applications include, but are not limited to, applying a coating material such as paint, to a substrate, an agricultural application such as applying a fertilizer, insecticide, or herbicide to plants.

While examples described herein are in the context of applying paint to a surface, it is understood that the concepts are not limited to these particular applications. As used herein, paint includes substances composed of coloring matter, or pigments, suspended in a liquid medium as well as substances that are free of coloring matter or pigment. Paint may also include preparatory coatings, such as primers, and can be opaque, transparent, or semi-transparent. Some particular examples include, but are not limited to, latex paint, oil-based paint, stain, lacquers, varnishes, inks, etc.

SUMMARY

A spray tip for a fluid applicator includes a stem configured to be inserted into the fluid applicator. The stem includes a stem pre-orifice portion and an insert receiving portion. The spray tip includes a pre-orifice insert having an inlet and an outlet. The pre-orifice insert is disposed within the insert receiving portion and disposed against a rearward shoulder of the stem.

This summary is provided to introduce a selection of concepts in a simplified form that are further described below in the Detailed Description. This summary is not intended to identify key features or essential features of the claimed subject matter, is not intended to describe each disclosed embodiment or every implementation of the claimed subject matter, and is not intended to be used as an aid in determining the scope of the claimed subject matter. Many other novel advantages, features, and relationships will become apparent as this description proceeds. The figures and the description that follow more particularly exemplify illustrative embodiments.

DETAILED DESCRIPTION OF THE DRAWINGS

In a fluid spraying system, a pump receives and pressurizes a fluid, delivers the pressurized fluid to an applicator, which, in turn, applies the pressurized fluid to a surface using a spray tip having a geometry selected to emit a desired spray pattern (e.g., a round pattern, a flat pattern, or a fan pattern, etc.). The fluid may comprise any fluid applied to surfaces, including, but not limited to, for example, paint, primer, lacquers, foams, textured materials, plural components, adhesive components, etc. For the sake of illustration, and not by limitation, the example of a paint spraying system will be described in detail.

Figure 1:
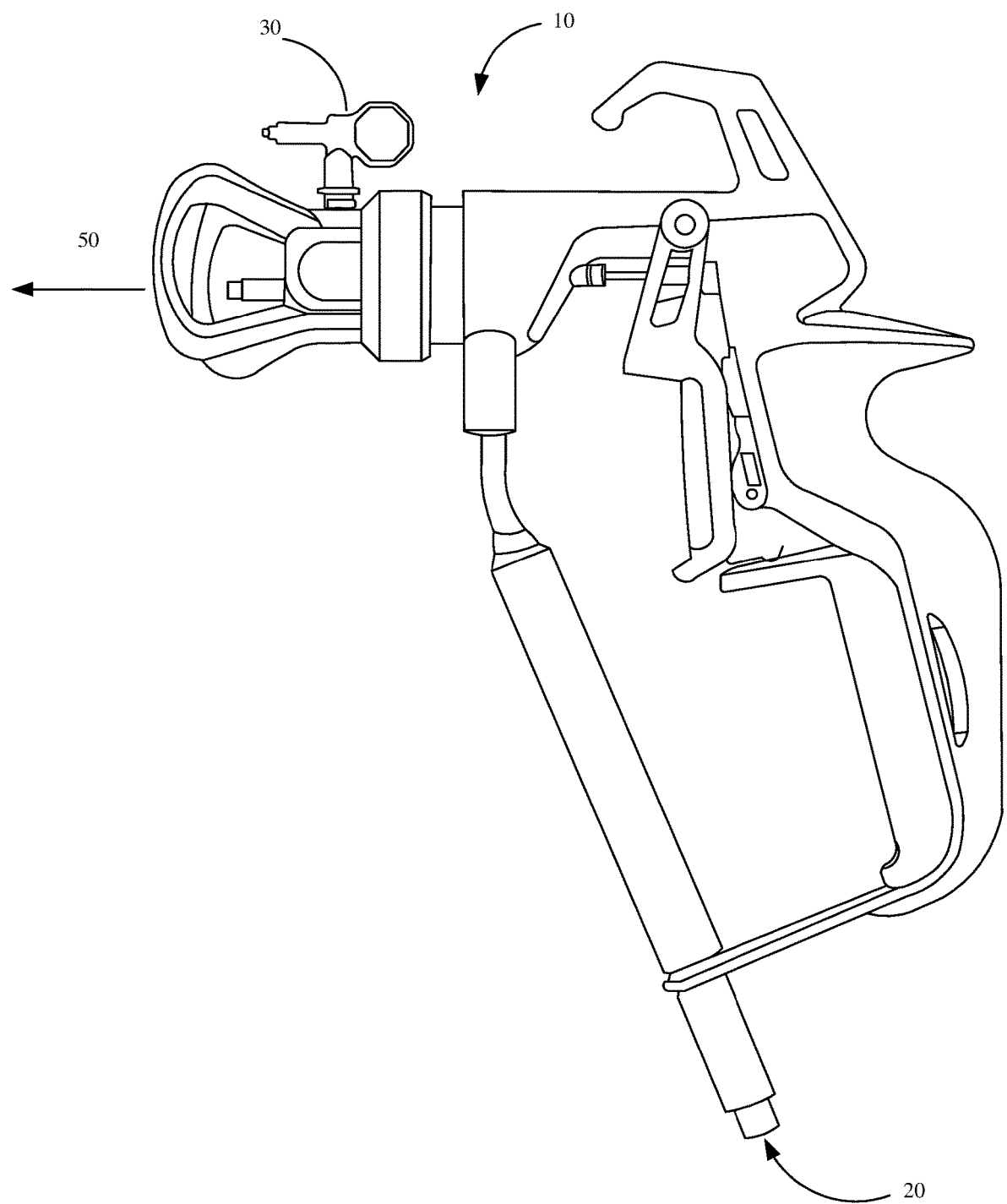
FIG. 1 is a side view of an example fluid applicator.

FIG. 1 is a side view showing an example applicator 10. Applicator 10 is used in a fluid spraying system to apply fluid to a surface (e.g., apply paint to a wall). The fluid enters through inlet 20, and exits from outlet 50, after passing through a fluid channel (not explicitly shown) within applicator 10. Tip 30 is coupled to applicator 10 and has an outlet 50. Tip 30 often is reversible or removable from applicator 10. Tip 30 may have a pre-orifice configuration consisting of an internal geometry that provides a desired spray pattern (e.g., a fan that has minimal tailings or other beneficial fluid dynamics).

Figure 2A:
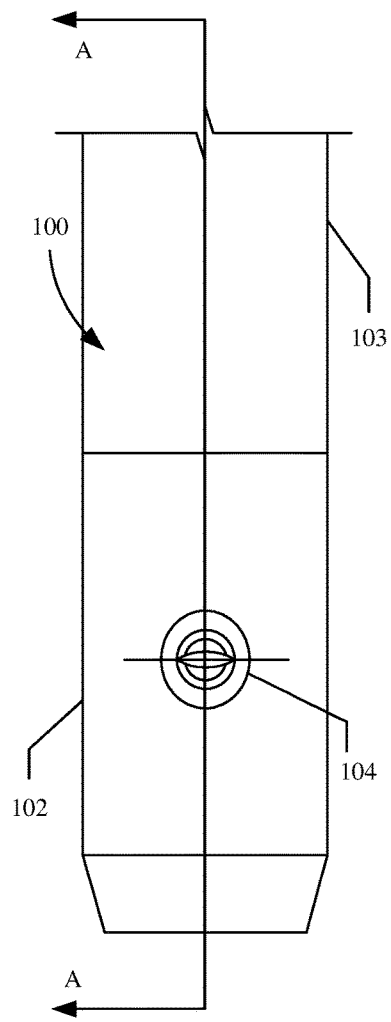
FIG. 2A is a side view showing an example spray tip.

FIG. 2A is a side view showing an example spray tip 100. Spray tip 100, for example, could be used in applicator 10. Spray tip 100 includes stem 102, flag 103 and channel 104. Stem 102 is typically cylindrical to allow rotation of spray tip 100 in an applicator (e.g., applicator 10 in FIG. 1). Stem 102 can be formed of stainless steel, tungsten carbide or another suitable material. Flag 103 couples to stem 102 and allows a user to rotate and remove spray tip 100 from applicator 10. Flag 103 can be press fit over stem or over molded onto stem, but other materials and methods of attachment are also envisioned. Channel 104 is disposed through stem 102 and allows fluid flow through spray tip 100. Channel 104 and components disposed within channel 104 can be shaped to accommodate different fluids and spray patterns.

Figure 2B:
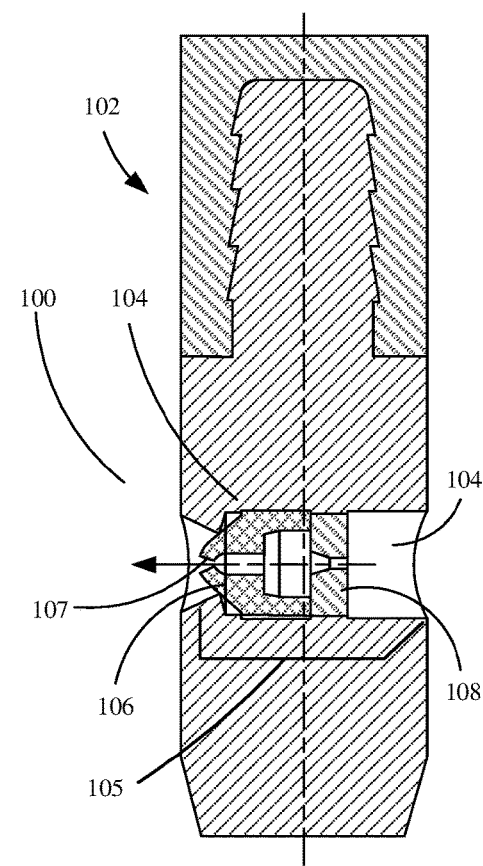
FIG. 2B is a sectional view showing the example spray tip of FIG. 2A.

FIG. 2B is a sectional view of spray tip 100 along section A-A in FIG. 2A. As shown, stem 102 includes a channel 104 that allows fluid flow through stem 102. Within channel 104 are pre-orifice inserts 106 and 108. Fluid flows in through channel 104 into pre-orifice insert 108 and then into pre-orifice insert 106 before being expelled through orifice 107. The internal structure of channel 104, pre-orifice insert 108, and pre-orifice insert 106 can greatly affect the spray pattern expelled from orifice 107.

Spray tip 100 may be manufactured using current assembly processes for spray tips. Normally, pre-orifice inserts 106 and 108 are manufactured separately from stem 102, and then inserted into channel 104. Such machining often utilizes outside diameter (OD) grinding of pre-orifice inserts 106 and 108 (which generally comprise tungsten carbide) with tight press tolerances. The pre-orifice inserts 106 and 108 are then inserted into channel 104 of stem 102. This process can create a large amount of scrap. Additionally, after the OD grinding process, pre-orifice inserts 106 and 108 might not press into stem 102 straight—in which case the assembly is considered a failure (e.g., the inserts do not align properly and can affect a desired spray pattern).

It is desired for a spray tip assembly process that does not require an OD grind, and where the parts assembly utilizes a slip fit, with a filler metal in a brazing process used to fill any gap. In one example, the filler metal used is a silver brazing filler metal. However, other suitable brazing filler metals, and other suitable bonding agents, are also envisioned.

Figure 3A:
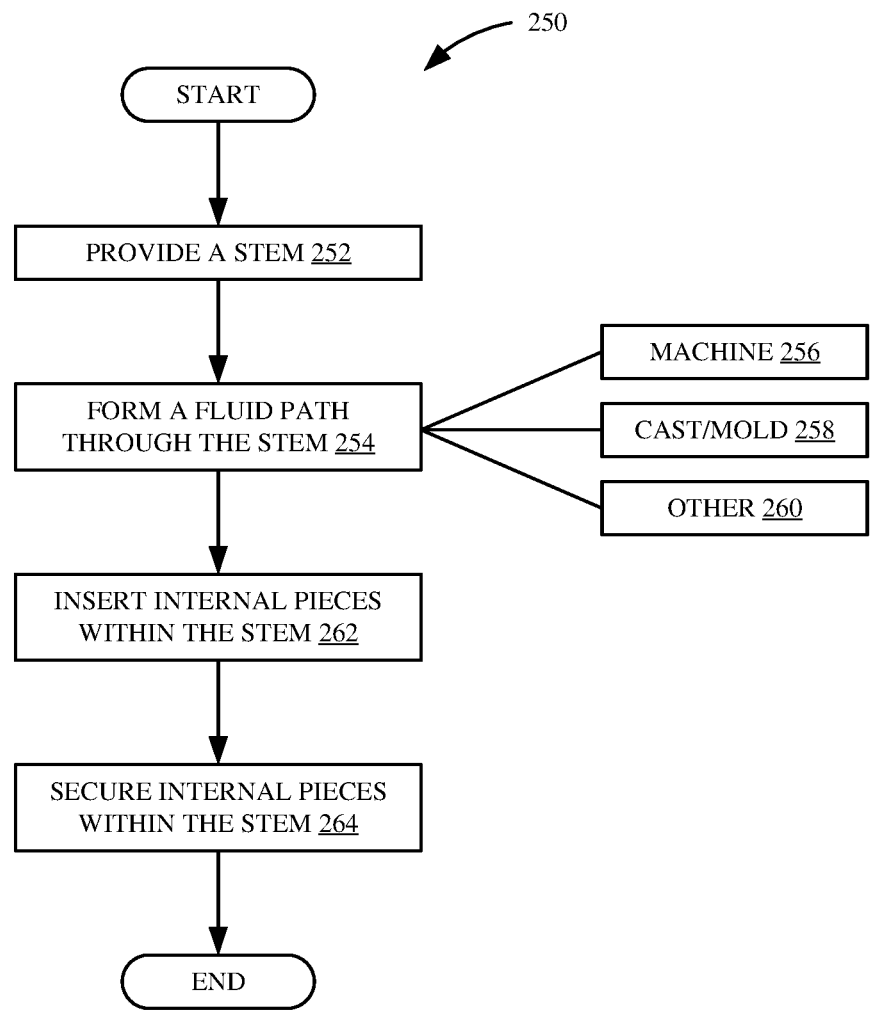
FIG. 3A is a flow diagram showing an example assembly operation of a spray tip.
Figure 3B:
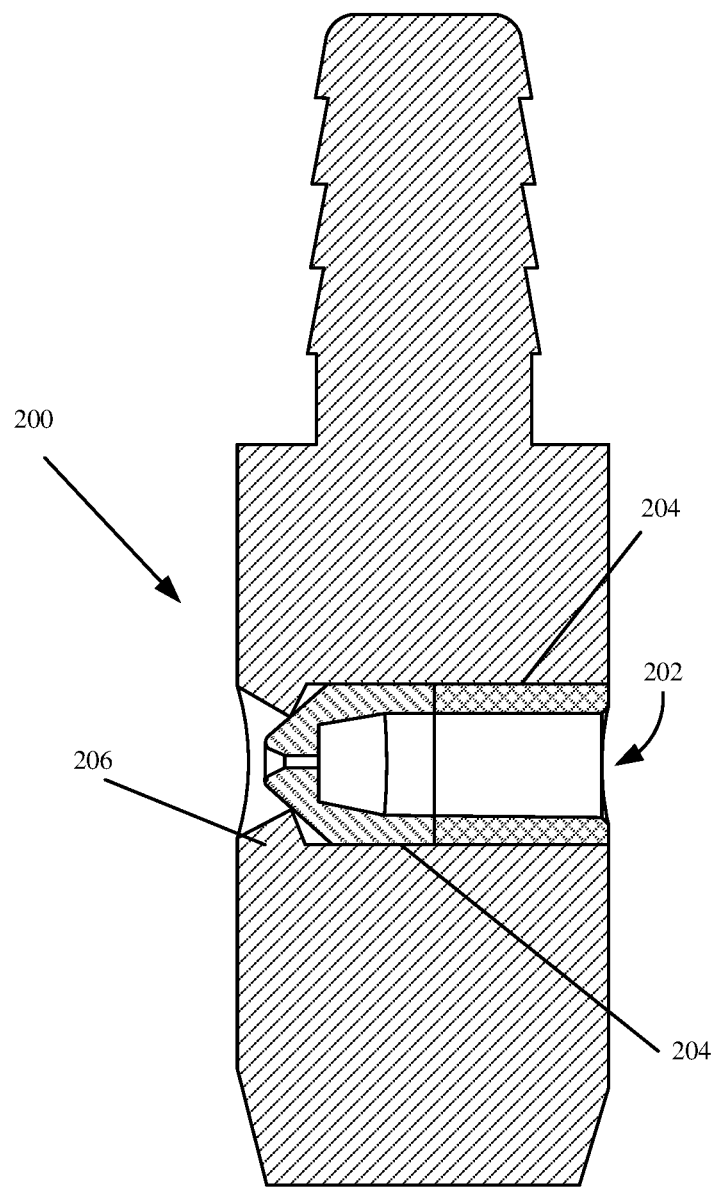
FIGS. 3B-3C are sectional views showing example steps of the assembly operation of FIG. 3A.
Figure 3C:
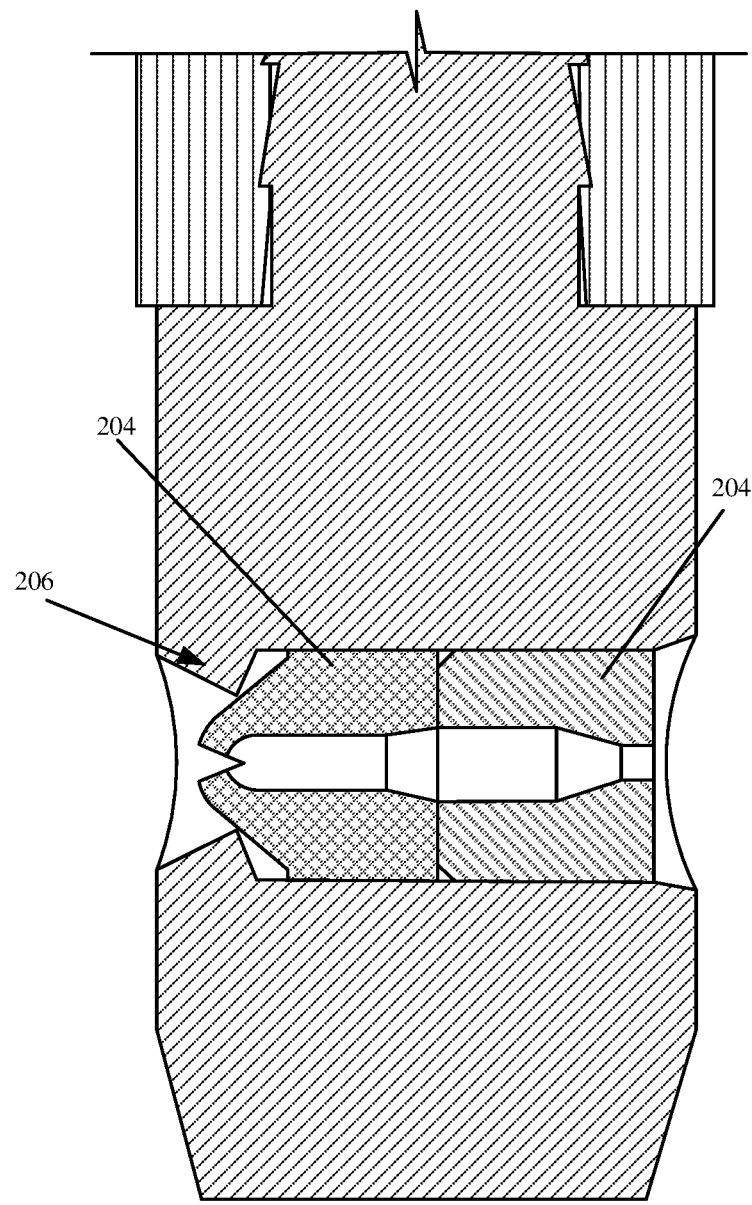

FIG. 3A is a flow diagram showing an example assembly operation 250. Assembly operation 250 is generally known, however, the internal geometries shown in FIGS. 3B and 3C, respectively show low-pressure and high-pressure geometry configurations. Assembly operation 250 begins at block 252 where a stem is provided for example stem 200 shown in FIGS. 3B and 3C.

Assembly operation 250 proceeds at block 254 where channel 202 is formed through stem 200. Channel 202 can be formed in a variety of different ways as indicated by blocks 256-260. As indicated by block 256, channel 202 can be machined or drilled through stem 200. For example, stem 200 is first formed as a cylinder and channel 202 is then bored into the cylindrical body of stem 200. As indicated by block 258, channel 202 can be casted or molded at the same time as stem 200. For example, the cylindrical shape of stem 200 is formed by a casting process, however, a die is placed in the casting mold to create channel 202 in the stem forming casting process. As indicated by block 260, channel 202 can be formed in other ways as well.

Assembly operation 250 proceeds at block 262 where pre-orifice inserts 204 are inserted within the stem 200. Assembly operation 250 then proceeds to block 264 where the pre-orifice inserts 204 are secured within stem 200. For example, the inserts are press fit against block 206 and as fluid flows through the inserts they are further forced against block 206 and cannot be pushed through entirely through channel 202. In one example, pre-orifice inserts 204 are press fit into channel 202 and are held in by friction.

Figure 4A:
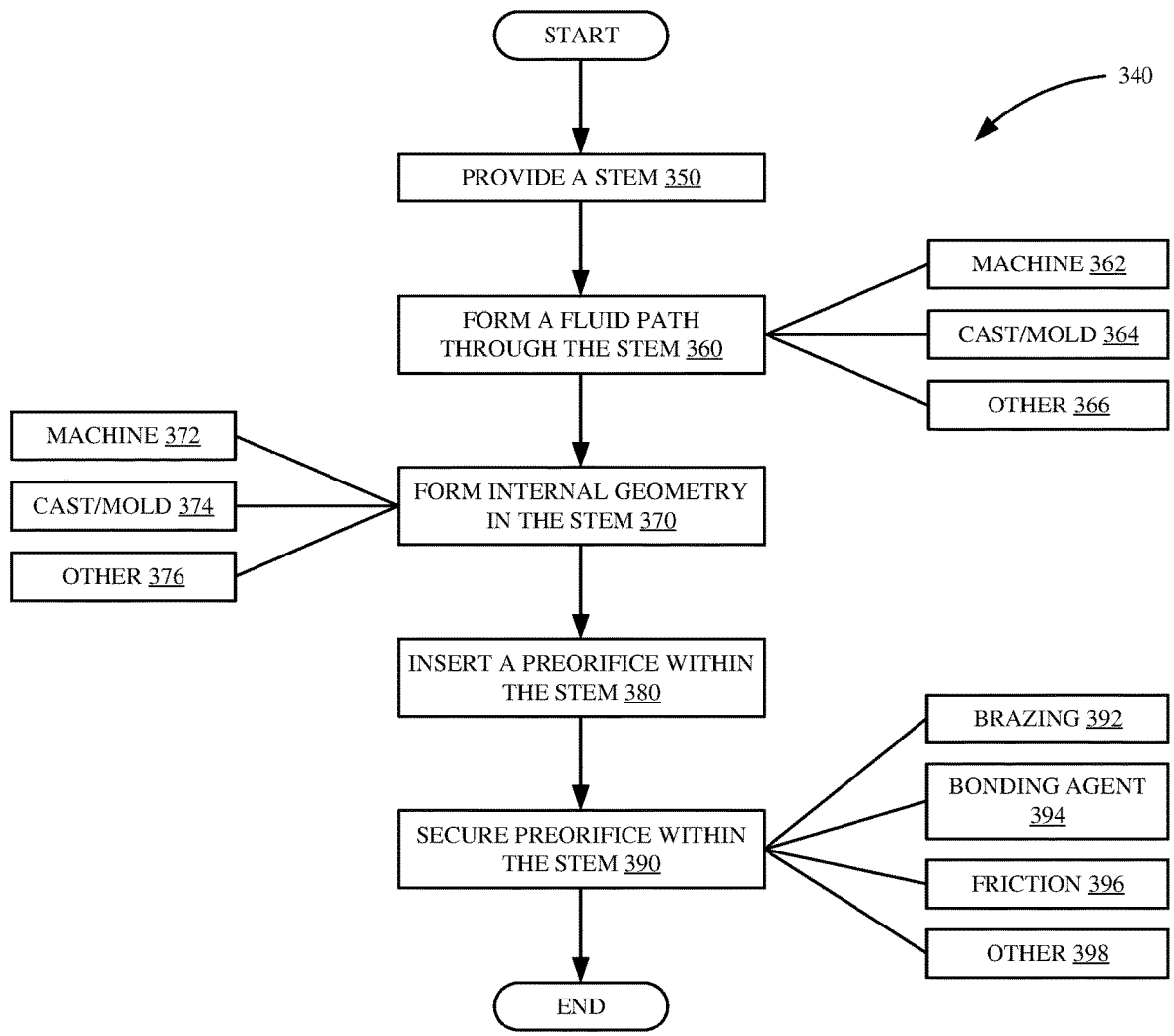
FIG. 4A is a flow diagram showing an example assembly operation of a spray tip.
Figure 4B:
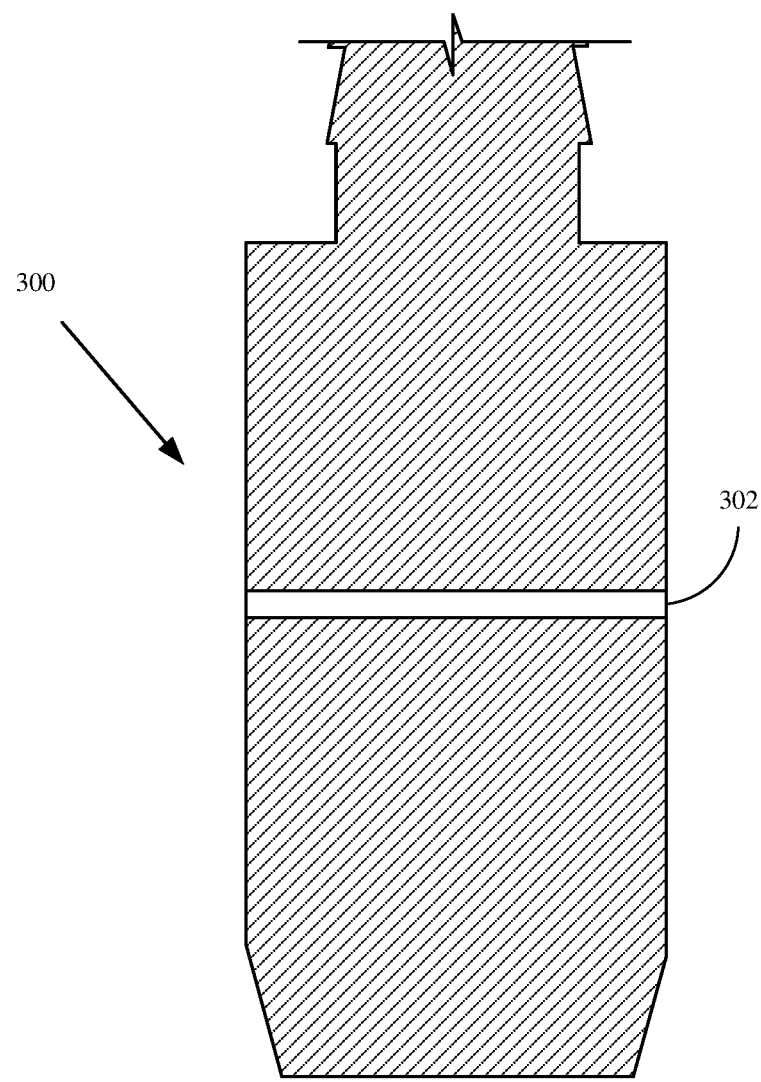
FIGS. 4B-F are sectional views showing example steps of the assembly operation of FIG. 4A.

FIG. 4A is a flow diagram showing an example assembly operation 340. Assembly operation 340 will be described with reference to FIGS. 4B-4F. Assembly operation 340 begins at block 350 where a stem is provided (e.g., stem 300).

Assembly operation 340 proceeds at block 360 where a channel 302 is formed through the stem 300. Channel 302 is shown formed in FIG. 4B. Channel 302 can be formed in a variety of different ways as indicated by blocks 362-366. As indicated by block 362, channel 302 can be machined or drilled through stem 300. For example, a drill bit, end mill, or other tooling can be used to subtractively create the channel 302. As indicated by block 364, the channel 302 can be cast or molded into stem 300 during casting or molding of stem 300. For example, a die is provided through the body of the mold to create channel 302. As indicate by block 366, channel 302 can be formed in stem 300 in other ways as well.

Figure 4C:
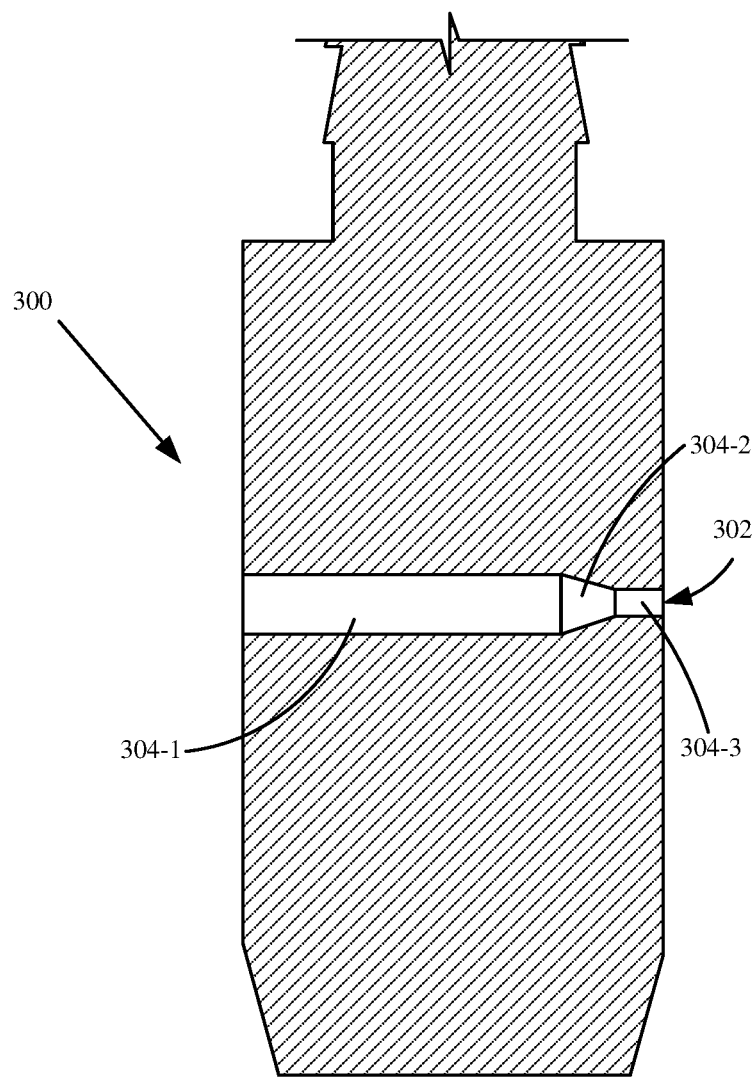

Assembly operation 340 proceeds at block 370 where internal geometry is formed in the stem. As shown in FIG. 4C, internal geometry can include channel 302. As shown, portion 304-1 includes a cylindrical geometric portion, portion 304-2 is a frustoconical geometric portion and portion 304-3 is a cylindrical portion with a smaller diameter of than portion 304-1. In this instance, portion 304-3 is the unmodified portion of channel 302 shown in FIG. 4B. Of course these are only examples and more complex geometry can also be formed in stem 300 such as step steps, spherical or other more complex shaping. The internal geometry formed in stem 300 can be formed in a variety of different ways as indicated by blocks 372-376. As indicated by block 372, the internal geometry can be machined or drilled in stem 300. For example, utilizing the channel 302 as a guide, a tapered bit could drill into channel 302 all the way down to portion 304-3 and then to form portion 304-1 and 304-2. (Drilling with this tapered bit all the way through stem 300 would create only one portion that would be similar to portion 304-1). As indicated by block 374, portion(s) 304 can be formed while casting or molding stem 300. Portion(s) 304 can be formed in other ways as well, as indicated by block 376.

Figure 4D:
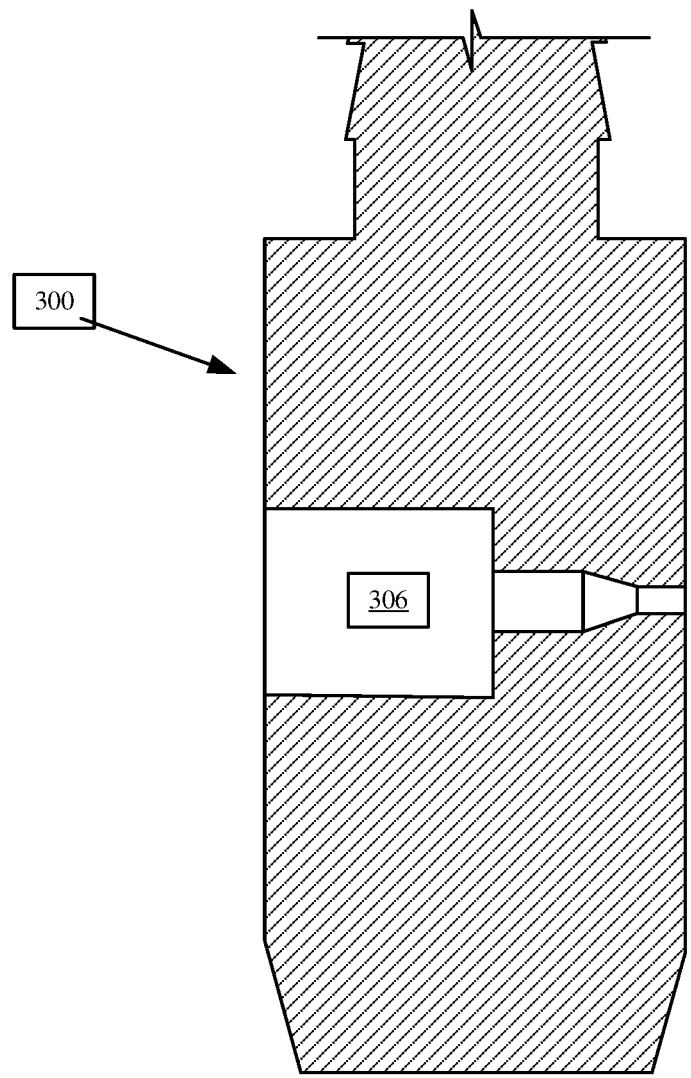
Figure 4E:
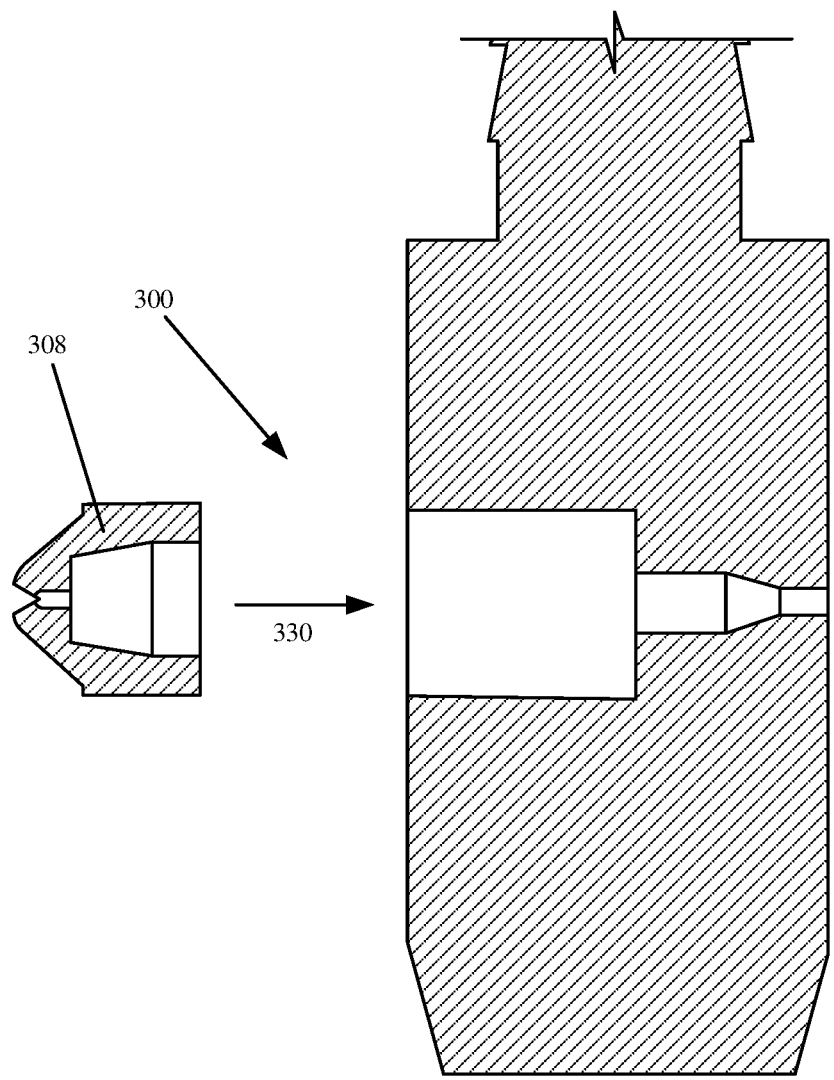
Figure 4F:
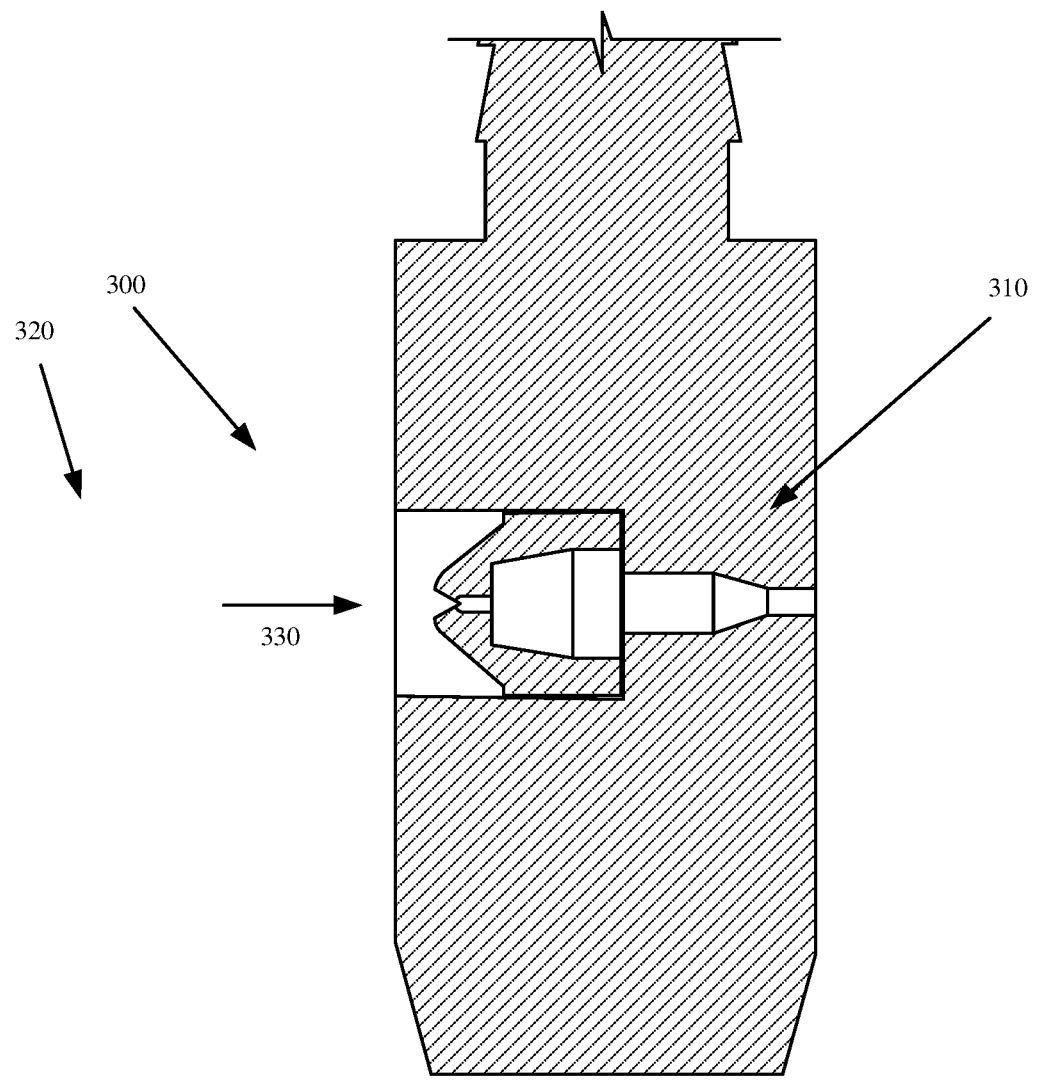

Assembly operation 340 proceeds at block 380 where a pre-orifice retaining portion is formed (as shown in FIG. 4D) and the pre-orifice insert is inserted within stem 300 (as shown in FIG. 4E). For example, pre-orifice insert receiving portion 306 can be formed in similar ways as portions 304 (e.g., drilled, milled, molded, etc.). After the pre-orifice insert receiving portion 306 is formed, pre-orifice insert 308 can be inserted into pre-orifice insert receiving portion 306. In some examples, pre-orifice insert 308 is press fit into pre-orifice insert receiving portion 306. In other examples pre-orifice insert 308 snugly fits into pre-orifice insert receiving portion 306 such that a press is not needed. In other examples, pre-orifice insert 308 can loosely fit in pre-orifice insert receiving portion 306 to allow for more aligning options. In some examples, more than one pre-orifice insert 308 can be inserted into pre-orifice insert receiving portion 306.

Assembly operation 340 proceeds at block 390 where the pre-orifice insert is secured within the stem. Pre-orifice insert 308 can be secured within the stem in a variety of different ways as indicated by block 392-398. As indicated by block 392, the pre-orifice insert 308 can be secured by brazing pre-orifice insert 308 into stem 300. For example, a filler metal can be provided and brazed from the downstream direction of pre-orifice insert 308 and fill in a gap between pre-orifice insert 308 and stem 300, securing pre-orifice insert 308. As indicated by block 394, a bonding agent can be used to secure pre-orifice insert 308 in stem 300. For example, a glue, epoxy etc. can be used as a bonding agent to secure pre-orifice insert 308 into stem 300. As indicated by block 396, pre-orifice insert 308 can be secured in stem 300 by friction of (e.g., pre-orifice insert 308 tightly fits in pre-orifice insert receiving portion 306 such that it will not fall out under an applied fluid pressure flowing through channel 302). Pre-orifice insert 308 can be secured in other ways as well, as indicated by block 398. For example, a combination of one or more methods could be used. For instance, pre-orifice insert 308 may be secured using friction and a bonding agent.

Figure 5A:
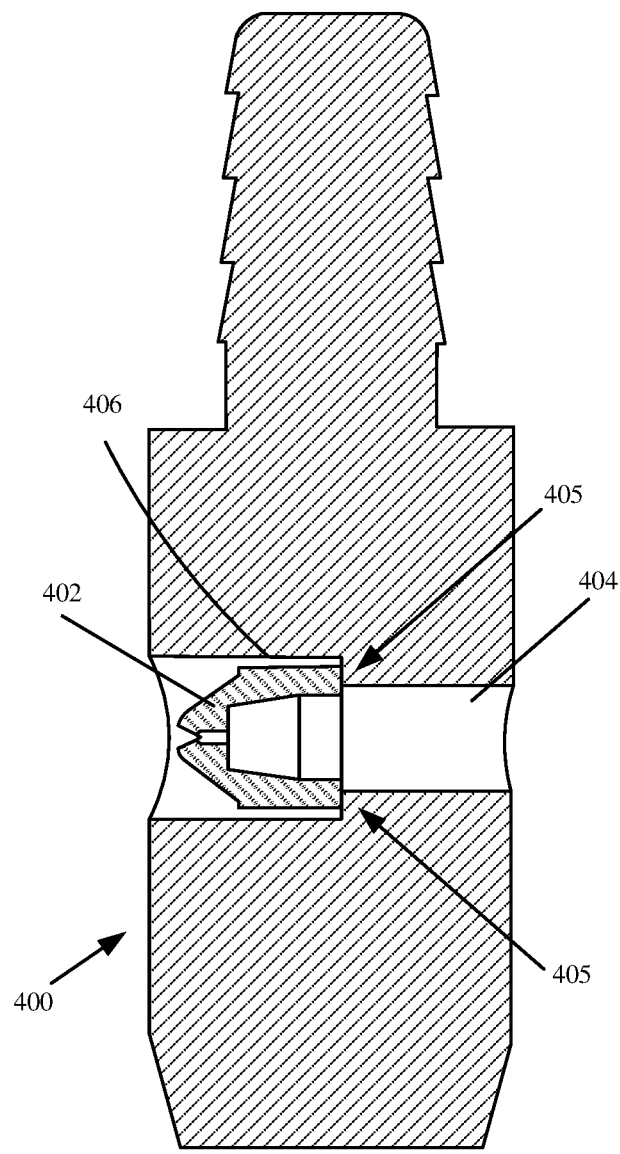
FIGS. 5A-5F are sectional views showing example spray tip assembly configurations.

FIGS. 5A-5F are sectional views showing example spray tip assembly configurations. As shown in FIG. 5A, a stem 400 includes a stem pre-orifice portion 404, configured to guide fluid to pre-orifice insert 402. Gap 406 between pre-orifice insert 402 and stem 400, can allow for a fastening material to be applied to couple pre-orifice insert 402 to stem 400. A fastening material may include filler or a bonding agent (e.g., a silver brazing filler metal, an epoxy or a different bonding agent). As shown, pre-orifice insert 402 is disposed rearwardly against rear shoulder 405 such that fluid does not flow around pre-orifice insert 402. In some examples, the fastening material couples and/or bonds pre-orifice insert 402 to rear shoulder 405.

Figure 5B:
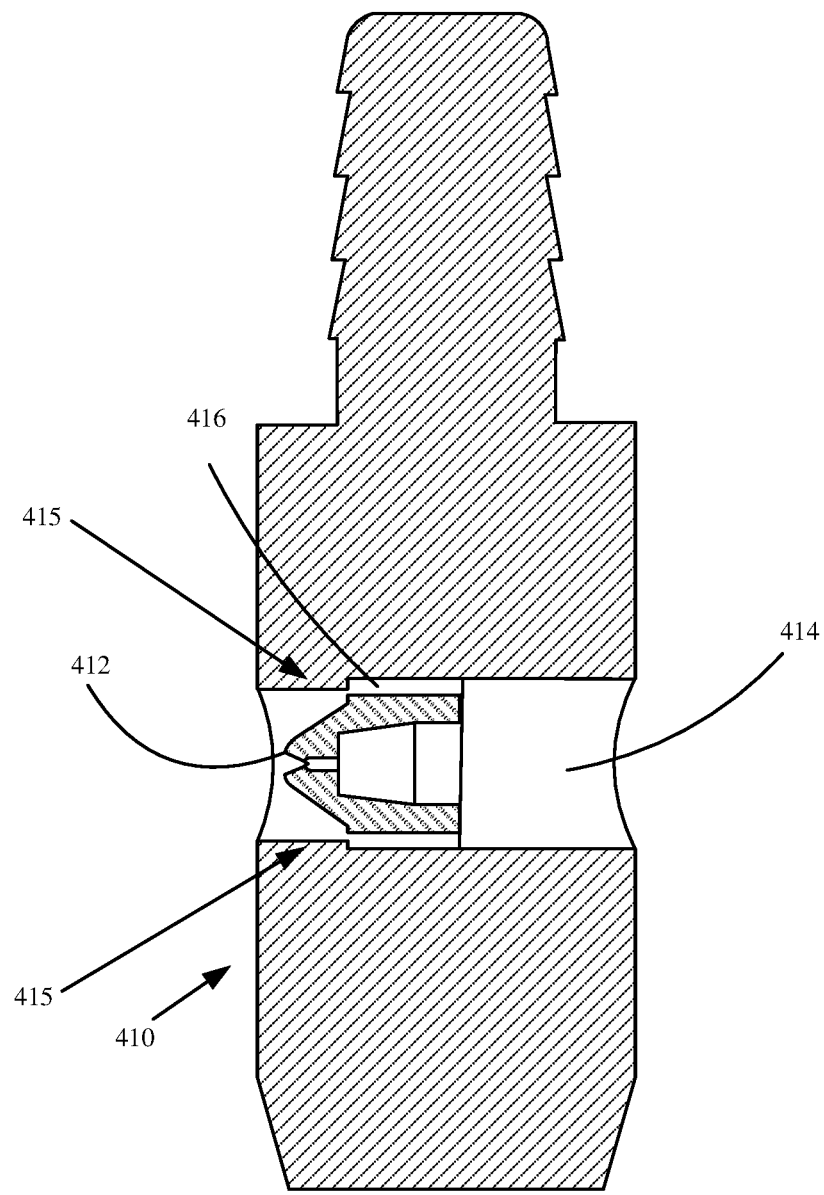

As shown in FIG. 5B, stem 410 includes a stem pre-orifice portion 414, configured to guide fluid to a pre-orifice insert 412. Gap 416 between pre-orifice insert 412 and stem 410 can allow for a fastening material to be applied to couple pre-orifice insert 412 within stem 410. A fastening material may include filler metal or a bonding agent (e.g., a silver brazing filler metal, an epoxy or some other bonding agent). As shown, pre-orifice insert 402 is disposed rearwardly of forward shoulder 415. In some examples, the fastening material couples and/or bonds pre-orifice insert 402 to forward shoulder 415.

Figure 5C:
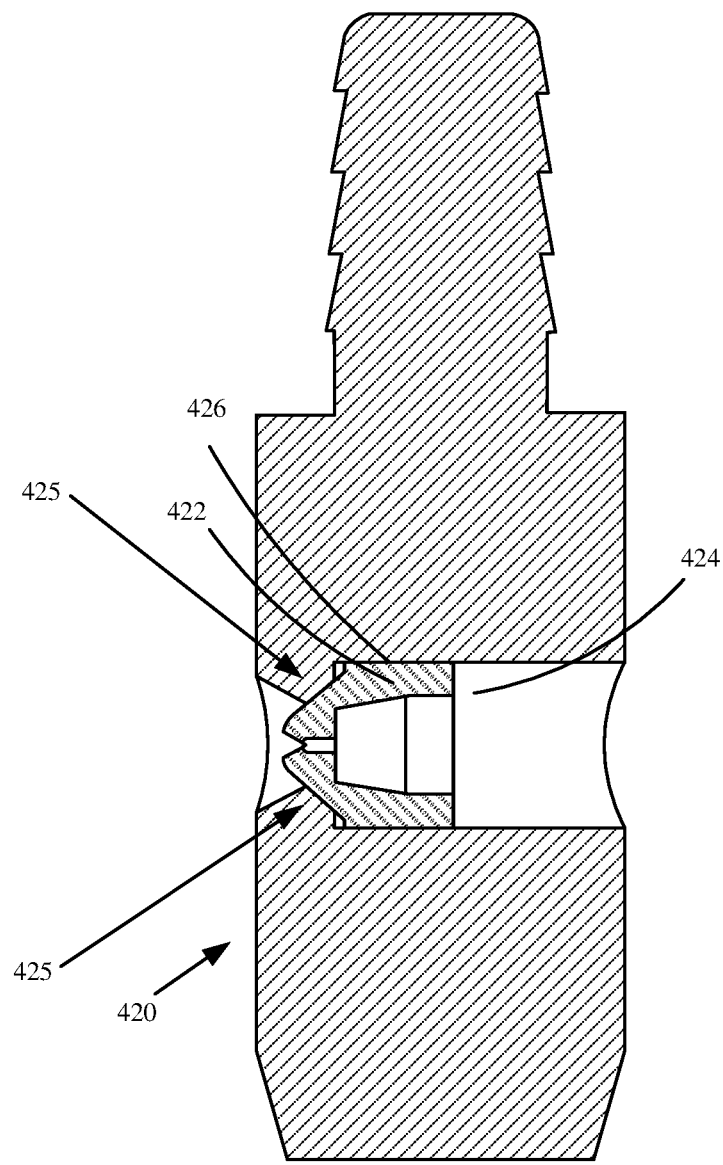

As shown in FIG. 5C, stem 420 includes a stem pre-orifice portion 424, configured to guide fluid to a pre-orifice insert 422. Gap 426 between pre-orifice insert 422 and stem 420 can allow for a fastening material to be applied to couple pre-orifice insert 422 within stem 420. A fastening material may include brazing material or a bonding agent (e.g., a silver brazing material or an epoxy bonding agent). As shown, pre-orifice insert 422 is disposed forwardly against forward shoulder 425 such that fluid under pressure does not force pre-orifice insert 422 out of stem 420. In some examples, the fastening material couples and/or bonds pre-orifice insert 422 to forward shoulder 425.

Figure 5D:
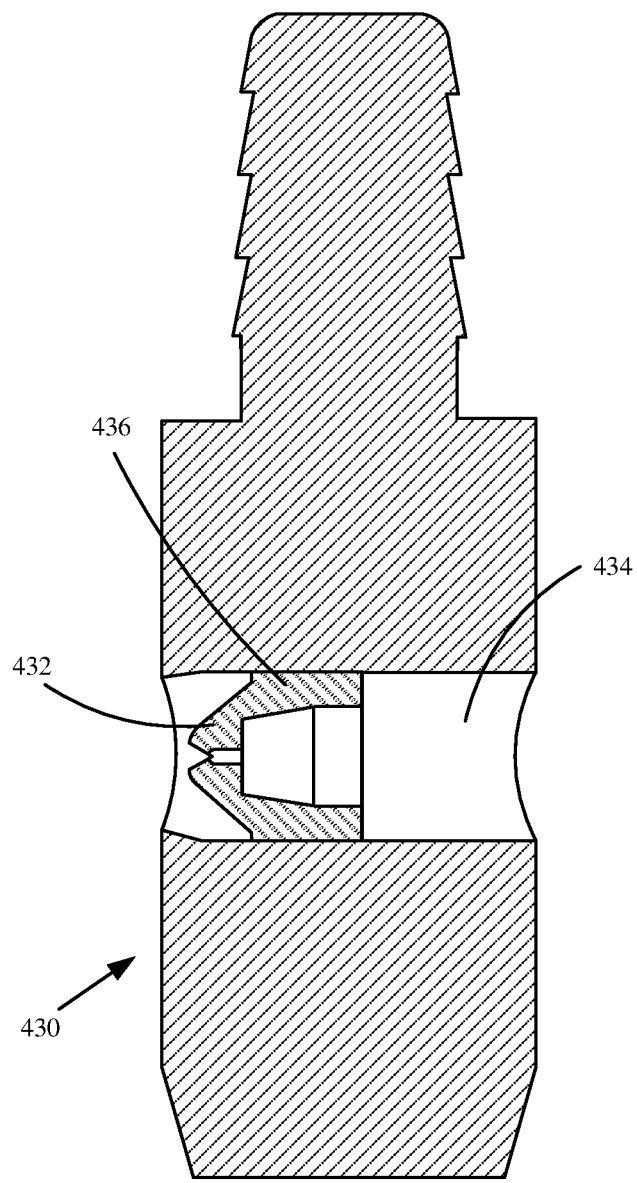

As shown in FIG. 5D, stem 430 comprises a stem pre-orifice portion 434, configured to guide fluid to a pre-orifice insert 432. Stem pre-orifice portion 434 may be machined or drilled as described above. Gap 436 between pre-orifice insert 432 and stem 430 can allow for a fastening material to be applied to couple pre-orifice insert 432 within stem 430. A fastening material may include brazing material or a bonding agent (e.g., a silver brazing material or an epoxy bonding agent).

Figure 5E:
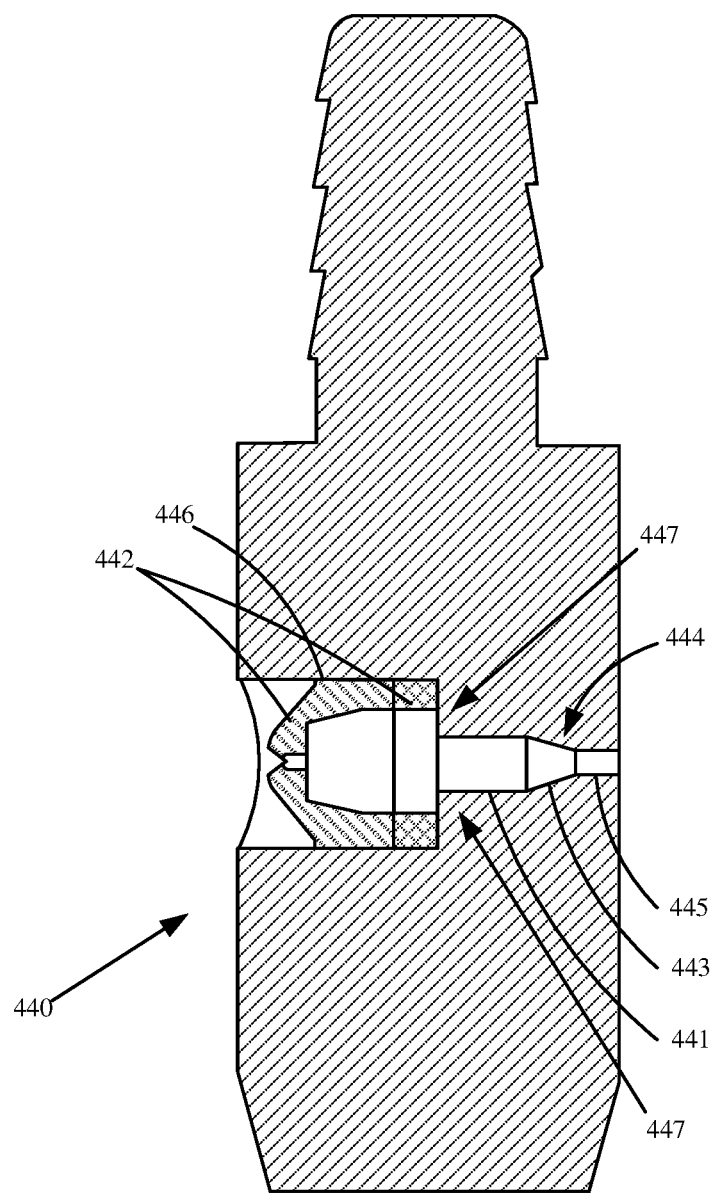

As shown in FIG. 5E, stem 440 includes a stem pre-orifice portion 444, configured to guide fluid to a pre-orifice insert 442. Stem pre-orifice portion 444 includes a cylinder 441, a frustrum 443 and a cylinder 445. In other examples, stem pre-orifice portion 444 can include other internal geometry in different configurations. For example, stem pre-orifice portion 444 can include the geometry of any available pre-orifice insert. For instance, stem pre-orifice portion 444 can remove the need for having two pre-orifice inserts to create internal concave geometry, such as a cavity or chamber that is wider than either the inlet or outlet. Some example geometries can include a plurality of stepped surfaces, widening surfaces, narrowing surfaces, spherical surfaces, cylindrical surfaces, etc. Gap 446 between pre-orifice insert 442 and stem 440 can allow for a fastening material to be applied to couple pre-orifice insert 442 within stem 440. A fastening material may include brazing material or a bonding agent (e.g., a silver brazing material or an epoxy bonding agent). Gap 446 can be determined based on the properties of the brazing material or bonding agent. In one example, gap 446 includes a distance in the range 0.000"-0.025." In one example, gap 446 includes a distance in the range 0.001"-0.005."

As shown, pre-orifice insert 442 is disposed rearwardly against rear shoulder 447 such that fluid does not flow around pre-orifice insert 442 and/or in between pre-orifice insert 442 and stem 440. In some examples, the fastening material couples and/or bonds pre-orifice insert 442 to rear shoulder 447.

Figure 5F:
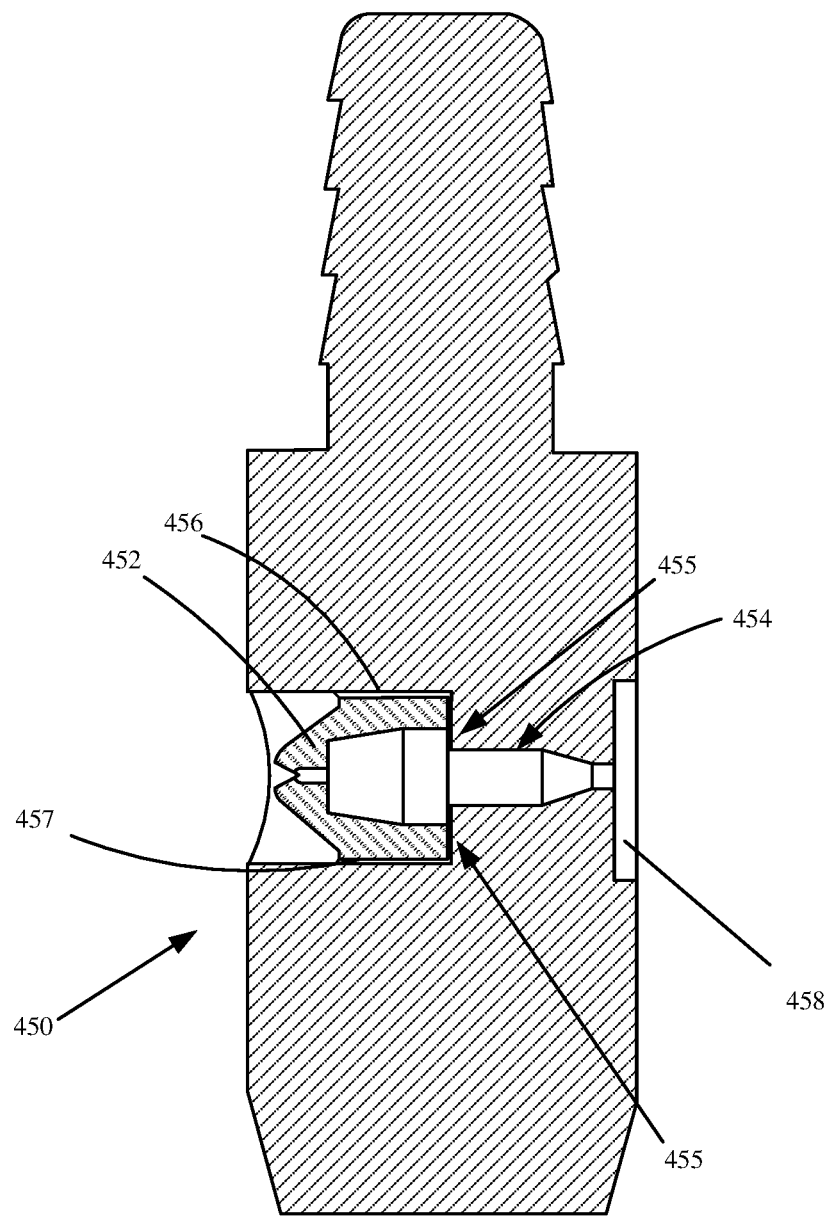

As shown in FIG. 5F, stem 450 includes a stem pre-orifice portion 454, configured to guide fluid to a pre-orifice insert 452. Gap 456 between pre-orifice insert 452 and stem 450 can allow for a fastening material 457 to be applied to couple pre-orifice insert 442 within stem 440. Fastening material 457 may include brazing material or a bonding agent (e.g., a silver brazing material or an epoxy bonding agent).

Stem 450 includes a counter bore 458. Counter bore 458, as shown, includes a cylindrical shape. However, in other examples, counter bore 458 can include other geometries (e.g., frustums, steps, spheres, etc.). As shown, pre-orifice insert 452 is disposed rearwardly against rear shoulder 455 such that fluid does not flow around pre-orifice insert 452. As shown, the fastening material 457 couples and/or bonds pre-orifice insert 452 to rear shoulder 455.

Although the present invention has been described with reference to preferred examples, workers skilled in the art will recognize that changes may be made in form and detail without departing from the spirit and scope of the invention.

What is claimed is:

1. A method of manufacturing a spray tip for a fluid applicator, the method comprising:
    providing a cylindrical stem having a longitudinal axis, the longitudinal axis defining an axis of rotation of the cylindrical stem;
    creating a channel through the cylindrical stem, the channel extending, in a direction transverse to the longitudinal axis of the cylindrical stem;
    widening a part of the channel to define a first portion and to form a second portion and a third portion, the second portion comprising a frustum that widens as the frustum continues in a direction moving away from the first portion, and the third portion having a diameter greater than a diameter of the first portion;
    widening a first part of the third portion to define a pre-orifice portion and to form an insert receiving portion, the pre-orifice portion comprising the first portion, the second portion, and a second part of the third portion, the insert receiving portion extending cylindrically from the pre-orifice portion and defining an opening at a first end of the cylindrical stem;
    inserting a pre-orifice insert into the insert receiving, portion through the opening defined by the insert receiving portion such that the pre-orifice insert is disposed wholly within the insert receiving portion and the insert receiving portion extends past an end of the pre-orifice insert; and
    securing the pre-orifice insert into the insert receiving portion.

2. The method of claim 1, wherein securing the pre-orifice insert comprises brazing the pre-orifice insert into place or applying a bonding agent to the pre-orifice insert.

3. The method of claim 1, wherein securing the pre-orifice insert comprises providing a filler metal within the insert receiving portion.

4. The method of claim 1, wherein creating the channel through the cylindrical stem comprises machining a hole through the cylindrical stem to create the channel.

5. The method of claim 1, further comprising:
    grinding the pre-orifice insert to an insert diameter that is at least 0.001" smaller than a diameter of the insert receiving portion.

6. The method of claim 1, wherein inserting the pre-orifice insert comprises disposing a furthest downstream surface of the pre-orifice insert against a rear shoulder of the insert receiving portion.

7. The method of claim 1 and further comprising:
    widening a part of the first portion to form a counterbore, the counterbore defining an opening at a second end of the cylindrical stem, opposite the first end, and having a greater diameter than a diameter of the pre-orifice portion.

8. A method of manufacturing a reversible spray tip for a fluid applicator, the method comprising:
    providing a cylindrical stem having a longitudinal axis, the longitudinal axis defining an axis of rotation of the stem;

machining a channel that extends through the stem in a direction transverse to the longitudinal axis of the stem;

machining a first part of the channel to widen the first part of the channel to define a first portion and to form a second portion and a third portion, the first portion comprising a second part of the channel, the second portion comprising a frustum that widens as the frustum continues in a direction moving away from the first portion, and the third portion extending from the second portion toward a first end of the stem and having a diameter greater than the diameter of the first portion;

machining a first part of the third portion to define a pre-orifice portion and to form an insert receiving portion, the pre-orifice portion comprising the first portion, the second portion, and a second part of the third portion, the insert receiving portion extending at a continuous diameter from the pre-orifice portion and defining an opening at the first end of the stem;

inserting a pre-orifice insert into the insert receiving portion through the opening defined by the insert receiving portion such that the pre-orifice insert is disposed wholly within the insert receiving portion and is configured to receive fluid from the second part of the third portion and such that the insert receiving portion extends past an end of the pre-orifice insert; and securing the pre-orifice insert into the insert receiving portion.

9. The method of claim 8, wherein securing the pre-orifice insert comprises brazing the pre-orifice insert into place or applying a bonding agent to the pre-orifice insert.

10. The method of claim 8 and further comprising:
overmolding a flag onto the stem.

11. The method of claim 10, wherein providing the stem comprises providing the stem comprising a first portion and a second portion, the first portion having a wider diameter than the second portion:
wherein machining the channel that extends through the stem comprises machining the channel that extends through the first portion of the stem; and
wherein overmolding the flag onto the stem comprises overmolding the stem onto the second portion of the stem.

12. The method of claim 8, wherein machining the channel that extends through the stem comprises:
machining the channel through a circular portion of the stem.

13. The method of claim 8, wherein inserting the pre-orifice insert comprises disposing a furthest downstream end of the pre-orifice insert against a rear shoulder of the insert receiving portion.

14. The method of claim 8 and further comprising:
machining a part of the first portion to form a counterbore, the counterbore defining an opening at a second end of the stem, opposite the first end, and having a greater diameter than a diameter of the pre-orifice portion.

15. A method of manufacturing a spray tip for a fluid applicator, the method comprising:
providing a cylindrical stem having a longitudinal axis, the longitudinal axis defining an axis of rotation of the cylindrical stem forming a channel that extends through the cylindrical stem, the channel extending in a direction transverse to the longitudinal axis of the cylindrical stem from a first end of the cylindrical stem to a second end of the cylindrical stem;

forming in a first part of the channel a second portion and third portion, the forming of the second portion and third portion defining a first portion in a second part of the channel, the first portion extending from the second portion toward the second end of the cylindrical stem, the second portion extending from the first portion to the third portion, the third portion extending from the second portion toward the first end of the cylindrical stem and having a greater diameter than a diameter of the first portion;

forming in a first part of the third portion an insert receiving portion the forming of the insert receiving portion defining a pre-orifice portion, the pre-orifice portion comprising the first portion, the second portion, and a second part of the third portion, the insert receiving portion extending from the pre-orifice portion towards the first end of the cylindrical stem and defining, an opening at the first end of cylindrical stem;

inserting a pre-orifice insert into the insert receiving portion through the opening defined by the insert receiving portion such that the pre-orifice insert is disposed wholly within the insert receiving portion and the insert receiving portion extends past an end of the pre-orifice insert; and securing the pre-orifice insert into the insert receiving portion.

16. The method of claim 15, wherein the insert receiving portion has a greater diameter than a diameter than the first portion, the second portion, and the second part of the third portion.

17. The method of claim 15, wherein forming in the first part of the channel the second portion and the third portion comprises:
forming the second portion as a frustum.

18. The method of claim 17, wherein the first portion is cylindrical.

19. The method of claim 17, wherein forming the second portion as the frustum comprises:
forming the frustum to widen towards the third portion.

20. The method of claim 18 and further comprising:
forming in a first part of the first portion a counterbore, the counterbore extending from a second part of the first portion toward the second end of the cylindrical stem and defining an opening at the second end of the cylindrical stem.

* * * * *